April 21, 1970

W. O. AGAR 3,508,066

APPARATUS COMPRISING LIGHT-ELECTRIC TRANSLATING DEVICE FOR
MEASURING SPEED OF MOVING MEMBER HAVING AN
ORDINARY SURFACE

Filed June 16, 1966

INVENTOR
William Oliver Agar
BY
Baldwin, Wight, Diller & Brown
ATTORNEY

United States Patent Office
3,508,066
Patented Apr. 21, 1970

3,508,066
APPARATUS COMPRISING LIGHT-ELECTRIC TRANSLATING DEVICE FOR MEASURING SPEED OF MOVING MEMBER HAVING AN ORDINARY SURFACE
William Oliver Agar, Danbury, England, assignor to The Marconi Company Limited, London, England, a British Company
Filed June 16, 1966, Ser. No. 558,098
Int. Cl. G01n 21/30
U.S. Cl. 250—219    11 Claims

ABSTRACT OF THE DISCLOSURE

A moving member with an ordinary surface is caused by its relative motion to modulate the light reaching a light-electric translating device so that the output of the device comprises a noise modulation the frequency of a speed-representative major component of which is measured to provide the relative velocity of the member. The member may be illuminated by light source means or may be itself light emissive. In one embodiment, a grating is interposed between the member and the translating device while in another embodiment a pattern of light and shade having lines transverse to the relative motion of the member is projected onto the member.

---

Figure 1:
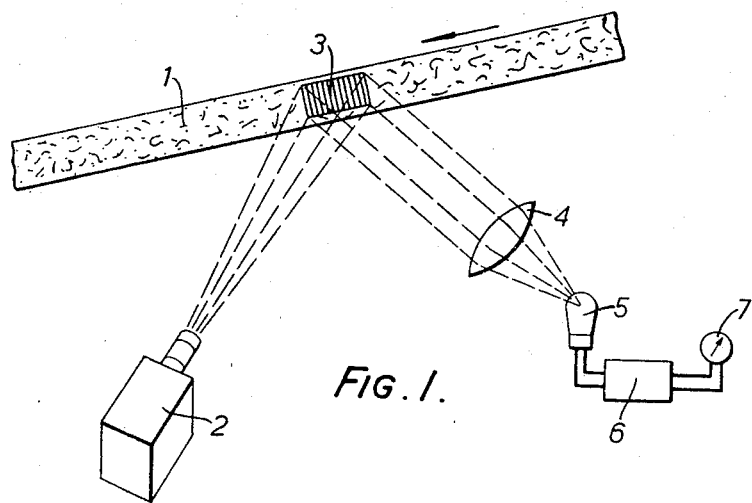

This invention relates to speed measuring apparatus. The invention is particularly applicable to and is primarily intended for the measurement of speed in industrial processes—e.g. the measurement of the speed of emergence of steel strip from a rolling mill—but it is not limited to applications of this nature but is widely applicable to speed measurement generally including the measurement of vehicle speeds.

The invention makes use of the phenomenon that light reflected from any ordinary surface, or light emitted by any ordinary heated surface, will vary from point to point thereof so that if such a surface is moved continuously across and in relation to a relatively fixed area and a light-electric translating device is arranged to receive light emitted by or reflected from said surface at it passes across said area, the resulting electric signal will not be steady and constant but will vary in random fashion and be akin to a "noise" signal. By "ordinary surface" and "ordinary heated surface" is meant a surface which has not been specially optically prepared to prevent the manifestation of the phenomenon just described and the word "light" is used in this specification in a wide sense to include both humanly visible light and light (e.g. infrared light) which is outside the range of human visibility.

According to this invention an apparatus for measuring the speed of a moving member in relation to a reference point includes one or more light-electric translating devices; means for subjecting said device or devices to activation by light from a continuously changing area or areas of said member fixed in relation to the reference point; and means for causing the motion of said member in relation to said reference point to modulate the light reaching said device or devices at a rate dependent on the speed of said motion.

The member may be an actually moving member, as, for example, when said member is a moving steel strip emerging from a steel mill. In such a case the reference point will normally be a fixed reference point. In other cases, however, the member itself may be fixed and the reference point may move. Such a case arises, for example, when the invention is used to ascertain the speed of a road vehicle along a road when the member is the road and is fixed and the reference point is the moving vehicle.

In most cases the light will be obtained from one or more light sources independent of the member but in cases in which the member itself is also a suitable source of light—for example if the member is steel strip in a sufficiently hot condition—it may itself serve as the light source, an independent light source being unnecessary.

In one way of carrying out the invention a light projector is arranged to project upon the member a pattern of light and shade having lines transverse to the direction of relative movement thereof, light reflected from said member in the area of said pattern being projected upon a photo-electric cell. The electrical output from said cell will contain a major component of a frequency dependent upon the speed of relative motion of said member and upon the spacing, in the direction of relative motion, of the said transverse lines. By measuring, in any convenient known way, the frequency of this component, the relative speed can be ascertained.

In a modification two similar patterns of light and shade, each having lines transverse to the direction of relative motion of the member and spaced along said member in said direction are projected on to the said member and light reflections therefrom in the areas of said patterns are projected on to separate photo-electric cells. The electrical outputs from the two cells will each contain a major component which, as before, is dependent upon the speed of relative motion and upon the line spacing in each of the two patterns and one of these two outputs will be time delayed with respect to the other by an amount dependent upon the speed of relative motion and upon the spacing, in that direction, of the two patterns. Accordingly, by measuring in any convenient known manner, the time delay or the relative phase of the two outputs, the speed of relative motion can be ascertained. Alternatively the spacing of the two patterns in the direction of relative motion may be made adjustable and the relative speed ascertained, in terms of this adjustment, by adjusting the said spacing of the two patterns until a predetermined time interval or phase relation is obtained. Obviously also, the relative speed can be ascertained as before by measuring the frequency of the major component present in either of the two cell outputs.

In embodiments in which relative speed is ascertained by measuring the time interval or phase relation of the outputs of two cells activated by light from two areas spaced along the member in the direction of relative motion, or by adjusting said spacing until a pre-determined time interval or phase relation is obtained, the optical apparatus necessary may be appreciably simplified and cheapened by employing, instead of two spaced patterns of light and shade, two simple spaced bright lines of light transverse to the direction of relative motion. If this is done the two cell outputs will obviously not contain a major component in the form of a number of cycles of a certain frequency but nevertheless they will be alike and one will be time delayed with respect to the other by a time interval dependent upon the relative speed and upon the spacing of the two lines. As before, therefore, measurement of the time interval or phase relation (these are obviously equivalent), or adjustment of the line spacing to produce a pre-determined time interval or phase relation, will enable the relative speed to be ascertained.

When the member is itself a source of light suitable for activating the cell or cells (or is, in effect, caused to be one by being subjected to general illumination) any of the foregoing embodiments may be modified by substituting for light projected into and reflected from the member, light emitted therefrom (or light coming therefrom as a result of general illumination thereof) by omitting the light projection means and modulating the light emitted by the member and reaching the cell or cells by modulating means interposed in the light paths thereto. Thus light from a continuously changing area on the member may be used to focus on to an optical grid of lines transverse to the direction of relative motion an image of said area and the light passing through said optical grid projected onto a photo-electric cell. As before the output of the cell will include a major component measurement of the frequency which will give relative speed. Similarly light from two continuously changing areas on the member and spaced in the direction of relative motion may be used to focus two optical grids of lines transverse to said direction or two light slots transverse to said direction upon two cells and relative speed may be ascertained by measuring the time interval between or relative phasing of the two cell outputs or by adjusting the spacing of the grids or light slots (as the case may be) until a predetermined time interval or relative phasing is obtained.

Figure 2:
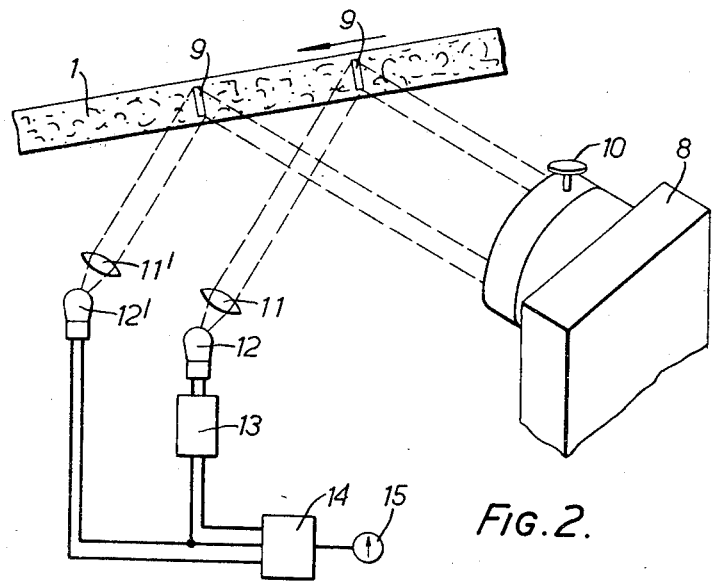
Figure 3:
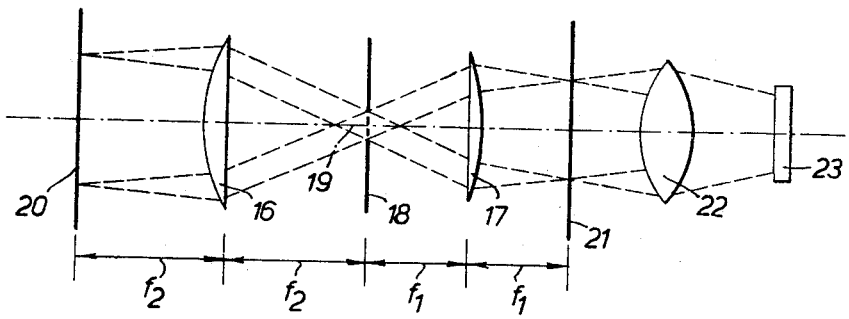

The invention is illustrated in the accompanying drawings of which FIGURES 1 and 2 respectively show, purely schematically, two embodiments thereof, and FIGURE 3 shows a preferred form of lens system used in the present invention. For simplicity of description it is assumed in the drawings that the member whose relative speed is to be measured is a steel strip emerging from a rolling mill and that its speed is to be measured in relation to a fixed reference point.

Referring to FIGURE 1, a continuously moving steel strip emerging from a rolling mill (not shown) is represented at 1 as moving in the direction of the arrow. A suitable light projector 2 projects onto the strip 1 a light pattern 3 (from a slide within the projector) consisting of a "grid" of lines of alternating light and shade extending perpendicularly with respect to the direction of motion of the strip. Light reflected from the pattern 3 is projected by any suitable optical system represented for simplicity as a lens 4 upon a photo-electric cell 5. Because different adjacent points (as indicated by "stipples") on the strip 1 will reflect light a little differently the output from the cell 5 will be what may be regarded as a "noise" signal with a definite frequency component, due to the lines of the pattern 3, superimposed. The frequency of the component will be a direct measure of the speed of the strip 1. For simplicity in the drawing, the output of the cell is represented as ampified by an amplifier 6 and fed to a frequency meter 7 which may be calibrated in speed. Obviously other methods of frequency measurement could be used and might well be preferred. For example the cell output could be fed to a frequency changer associated with a calibrated local oscillator and feeding into a fixed beat frequency amplifier. By observing the setting of the local oscillator, which could be calibrated directly in terms of speed, necessary to obtain a maximum beat frequency output, the speed can be ascertained. As already explained, if the strip is itself light emitting, or is caused in effect to be so by being subjected to general illumination the projector 2 can be dispensed with and light from an area of the strip used to focus onto an optical grid of transverse lines an image of the area, light passing through the grid falling on the cell 5.

In the modification represented in FIGURE 2 a light projection 8 is arranged to project two bright lines of light 9 and 9' onto the strip 1. These lines are at right angles to the direction of motion and are spaced apart in the direction of motion of the strip by a distance which can be adjusted over a desired range. This adjustment is effected optically in any convenient known manner (not shown) and is represented as effected by a control 10.

Light reflected from the lines 9 and 9' is focussed by any convenient similar optical systems represented by lenses 11 and 11' onto photo-cells 12 and 12'. The output of the cell 12 is delayed by a delay line or unit 13. The whole arrangement is such that when the time taken for a given point on the strip to travel from the line 9 to the line 9' is equal to the delay imposed by the delay unit 13 the signal at the output end of the delay unit 12 will occur simultaneously with as well as being substantially identical with the output from the cell 12'. These two outputs are fed to a balanced differential amplifier 14 which will give zero output signal, as indicated by a suitable indicator 15, when the control 10 is adjusted to achieve this condition. In this way, the speed of the strip can be ascertained by adjustment of control 10 which can be calibrated directly in terms of speed. Other means for utilising the outputs from the cells 11 and 11' to determine in effect the time taken by the strip to move through a known distance will suggest themselves to those skilled in the art and may be used.

Although the optical systems 4 of FIGURE 1 and 11, 11' of FIGURE 2 are represented by simple lenses, as in practice they could be, a simple lens suffers from the defect that its magnification varies with variation in the object distance and since it is difficult in some embodiments to maintain the object distance constant it is preferred to use optical systems of the type wherein the magnification is substantially independent of variations in object distance. One such known system is that known as the "Telecentric" type as shown in FIGURE 3. Referring to FIGURE 3 the lens system consists of two lenses 16 and 17 mounted so that their focal points coincide at a common point 19. An apertured plate 18 is positioned with its aperture at the common focal point 19. As may be seen from the rays represented in FIGURE 3, rays of light from the different points on the moving surface 20 pass parallel to one another between the lenses 16 and 17 and emerge to be focussed on a slide 21. The image formed on slide 21 is focussed by a lens 22 onto the photo-cell 23. With a lens system as shown in FIGURE 3 the effective magnification $f_1/f_2$ where $f_1$ is the focal length of lens 16 and $f_2$ is the focal length of lens 17, and the viewing distance may vary over a range limited only by the image definition at the slide 21.

I claim:

1. An apparatus for measuring the speed of a member having an ordinary surface moving in relation to a reference point, said apparatus including at least one light-electric translating device at said reference point; means for subjecting said device to activation by light transmitted from continuously changing areas of said ordinary surface fixed in relation to the reference point; means for measuring the frequency of a speed-representative major component of noise modulation present in the output of said at least one light-electric translating device and caused by the motion of said ordinary surface in relation to said reference point modulating the light reaching said device at a rate dependent on the speed of said motion, and a light projector arranged to project upon said ordinary surface a pattern of light and shade having lines transverse to the direction of relative movement of said member, light reflected from said ordinary surface in the area of said pattern being projected upon said light-electric translating device.

2. Apparatus as claimed in claim 1 wherein said at least one light-electric translating device comprises a photo-electric cell.

3. An apparatus as claimed in claim 1 wherein two similar patterns of light and shade, each having lines transverse to the direction of relative motion of the member and spaced along said member in said direction are projected onto said ordinary surface and light reflected therefrom in the areas of said patterns is projected onto separate light-electric translation devices.

4. Apparatus as claimed in claim 3 wherein said separate light-electric translating devices are photo-electric cells.

5. Apparatus as claimed in claim 1 wherein said reference point is fixed and said member moves.

6. Apparatus as claimed in claim 1 wherein said member is fixed and said reference point moves.

7. An apparatus as claimed in claim 3, comprising means for measuring the frequency of a speed-representative major component of modulation present in the output from either light-electric translation device due to the motion of the member relative to the reference point.

8. An apparatus for measuring the speed of a member having an ordinary surface moving in relation to a reference point, said apparatus including at least one light-electric translating device at said reference point; means for subjecting said device to activation by light transmitted from continuously changing areas of said ordinary surface fixed in relation to the reference point, the last said means comprising a lens system having a magnification which is substantially independent of object distance; and means for measuring the frequency of a speed-representative major component of noise modulation present in the output of said light-electric translating device and caused by the motion of said ordinary surface in relation to said reference point modulating the light reaching said device at a rate dependent on the speed of said motion.

9. Apparatus as claimed in claim 8 wherein said lens system comprises two lenses arranged with their focal points at a common point, an aperture plate having its aperture located at said common focal point, a screen onto which light passing through the said two lenses is focussed and means for projecting light on said screen onto said at least one light-electric translating device.

10. Apparatus as claimed in claim 8 wherein said reference point is fixed and said member moves.

11. Apparatus as claimed in claim 8 wherein said member is fixed and said reference point moves.

References Cited

UNITED STATES PATENTS

| | | |
|---|---|---|
| Re. 24,770 | 1/1960 | Doyle et al. |
| 2,413,349 | 12/1946 | Hancock et al. |
| 2,866,935 | 12/1958 | Robillard. |
| 2,967,449 | 1/1961 | Weiss. |
| 3,307,968 | 3/1967 | Schnedler. |

FOREIGN PATENTS

| | | |
|---|---|---|
| 151,129 | 10/1960 | Russia. |

RALPH G. NILSON, Primary Examiner

C. M. LEEDOM, Assistant Examiner

U.S. Cl. X.R.

324—70; 356—28, 199